United States Patent [19]

Farmer

[11] Patent Number: 4,796,466

[45] Date of Patent: Jan. 10, 1989

[54] SYSTEM FOR MONITORING PIPELINES

[76] Inventor: Ed Farmer, 1611 20th St., Sacramento, Calif. 95814

[21] Appl. No.: 15,739

[22] Filed: Feb. 17, 1987

[51] Int. Cl.⁴ .......................................... G01M 3/00
[52] U.S. Cl. .................................. 73/40.5 R; 73/49.1
[58] Field of Search .................. 73/40, 49.1, 40.5 R, 73/49.5; 364/507, 510, 558; 340/605

[56] References Cited

U.S. PATENT DOCUMENTS

| | | | |
|---|---|---|---|
| 4,106,099 | 8/1978 | Elliott et al. | 73/40.5 R |
| 4,280,356 | 7/1981 | Stewart | 73/40.5 R |
| 4,361,030 | 11/1982 | Heide | 73/40.5 R |
| 4,407,158 | 10/1983 | Petroff | 73/40.5 R |
| 4,507,128 | 3/1985 | Werner | 73/40.5 R |
| 4,586,144 | 4/1986 | Fukumoto | 364/510 |
| 4,670,847 | 6/1987 | Furuse | 73/49.2 |
| 4,672,842 | 6/1987 | Hasselmann | 73/49.2 |

Primary Examiner—John Chapman
Assistant Examiner—Hezron E. Williams
Attorney, Agent, or Firm—Mark C. Jacobs

[57] ABSTRACT

A system for monitoring pipelines through which fluids, be they gases or liquids flow using conventional readily available monitoring equipment, that determines the probability of a leak as opposed to the actuality of a leak using a moving average of statistical information gained from a plurality of monitoring stations that monitor either pressure or flow.

24 Claims, 2 Drawing Sheets

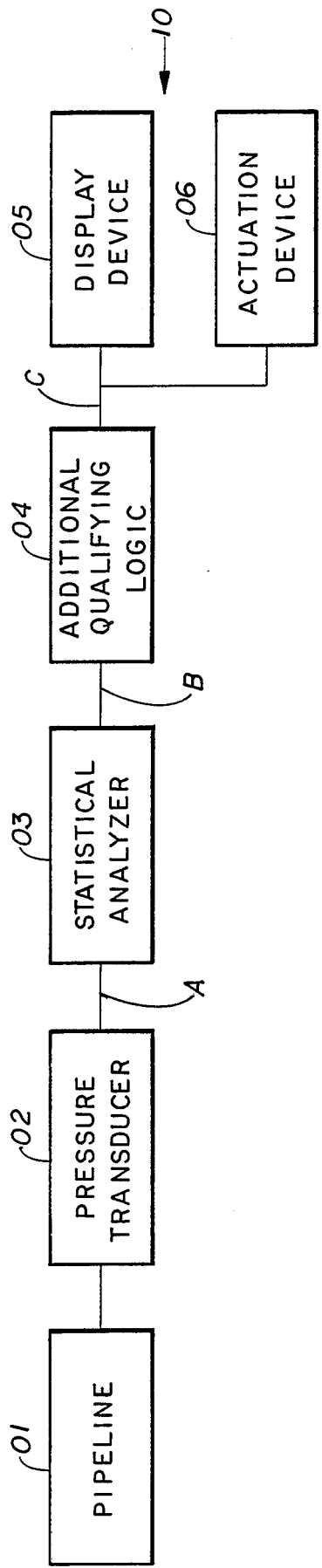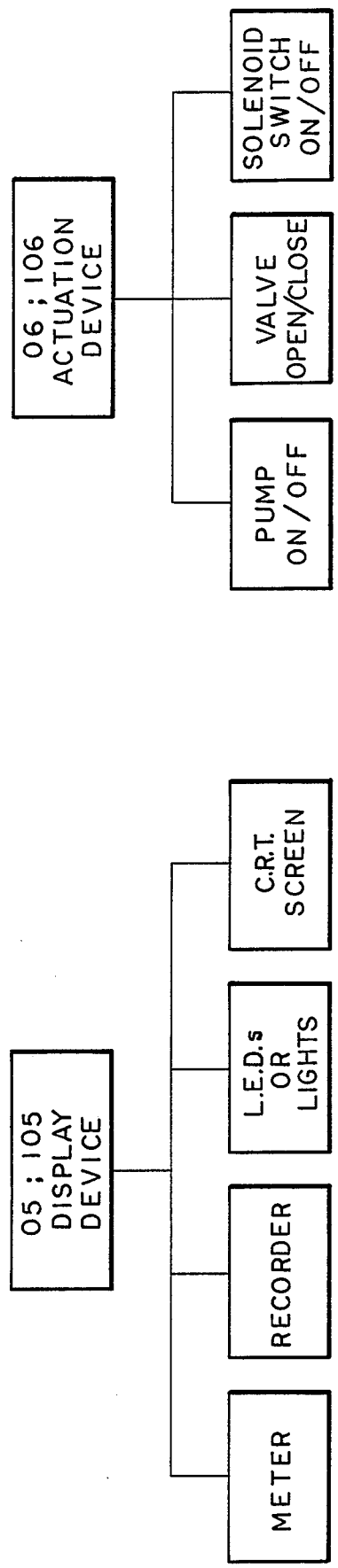

SYSTEM FOR MONITORING PIPELINES

BACKGROUND OF THE INVENTION

The invention herein pertains to a system of monitoring pipelines and other fluid pressurized vessels for the probability of leaks. The determination of such probability can be by pressure monitoring of the pipeline, or vessel, -pipeline-, or by monitoring of the velocity of flow therein.

Fluids such as oil, water, and natural gas among others are transported over long distances through varying geographical and weather differing areas. In these days of increased environmental awareness it is important to quickly detect the probability of leak along the pipeline. The monitoring for leakage must take place not only as a precaution against environmental pollution but to prevent uncontrolled hazardous releases.

Since a break or leak in the pipeline gives rise to a pressure drop one can monitor the pipeline from the pressure of the fluid. The prior art therefore has taken the approach to monitor the occurrence of pressure drops. Mention therefore may be made of U.S. Pats. Nos. 2,836,192 and 2,915,042 which reflect mechanical/pneumatic systems designed for this purpose.

Mention may also be mode of patents of Morris T. Covington et al U.S. Pat. Nos. 4,091,658, 4,144,743 and 4,012,944, all of which pertain to electronic leak detection methods. In the Covington et al systems a voltage proportional to flow of the fluid in the pipeline is monitored with a voltage proportional to the flow being differentiated to determine whether any rate of change of pressure exists. Ofttimes such a rate change is indicative of a leak in the pipeline.

One of the major shortcomings of the Covington class of monitoring systems is the fact that such a rate change may not be indicative of a leak in the pipeline. In addition "noise" which is defined as pressure or velocity perturbations arising from causes other than leaks can give rise to false alarms in the monitoring process. Such false alarms cause the persons monitoring the line to spend many hours of lost time in attempts to confirm the reality of alleged breaks in the line.

There is a need for a pipeline monitoring system that does not attempt to monitor actual leaks, but rather the probability of a leak taking place. There is also a need for a pipeline monitoring system that quantifies the data returned to thereby reduce the number of false alarms sounded due to erroneous detection of leaks.

It is an object therefore of this invention to provide a pipeline monitoring system that predicts the probability of a leak in the line by monitoring the pressure.

An important object of this invention is to perform the monitoring task adequately with conventional pipeline instrumentation, e.q. ordinary pressure and flow measuring instruments.

It is another object to provide a system that monitors a pipeline at various locations therealong by a statistical analysis of the probability of a leak.

A further object is to provide a pipeline monitoring system that can quantify the data to thereby reduce the number of false alarms encountered.

A yet further object is to provide a pipeline monitoring system that reduces the rate of false alarm leakage occurrences.

Other objects of the invention will in part be obvious, and will in part appear hereinafter.

The invention accordingly comprises the apparatus possessing the construction, combination of elements and arrangement of parts which are exemplified in the following detailed disclosure, and the scope of which will be recited in the appended claims.

For a fuller understanding of the nature and objects of the inventions, reference should be had to the following detailed description taken in conjunction with the accompanying drawings.

BRIEF DESCRIPTION OF THE DRAWINGS

FIG. 1 is a block diagram of a system according to the present invention for monitoring pipelines by pressure transducers.

FIG. 2 and 3 are block diagrams illustrating in detail information pertaining to two aspects of the invention.

SUMMARY OF THE INVENTION

Figure 4:
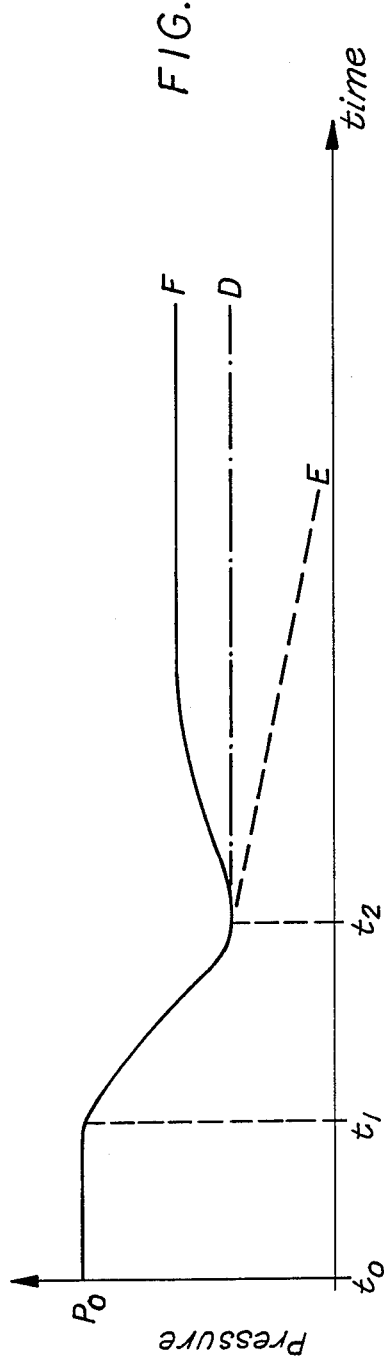
FIG. 4 is a graphic depiction of the pressure changes in a pipeline that are associated with a leak.

A method and system (apparatus) are described for the determination of the probability of a leak in a pipeline as determined by the statistical analysis of the monitoring of a moving average of readings determined from one or more monitors along the length of a pipeline.

A threshold level of probability may also be established to sound an alarm or take other action.

The probable existence of a leak, breakage or rupture in the system within a certain time framework is sought, which probability is based on the moving average of a large number of measurements within short intervals of time between each measurement.

DESCRIPTION OF THE PREFERRED EMBODIMENT

In FIG. 1, there is shown a pipeline 01 as the first block of this block diagram. It is used to carry fluids such as water, oil and natural gases far distances. While the discussions herein will be recited with respect to a pipeline, it is understood that the invention similarly pertains to a pressurized storage vessel such as a tank. While small variations will occur within the pipeline, for all intents and purposes the pressure is maintained substantially constant. Should a break, rupture, or leak develop as determined by a monitoring of the pressure within the vessel, corrective action will have to be taken.

Unlike other monitoring systems, this invention checks the probability of a leak, rupture, or break, and not necessarily the actuality.

The procedure to be described herein can be used to monitor pressure, or velocity of fluid within a pipeline. For pressure monitoring, readings are obtained from one or more pressure transducers while for fluid flow monitoring readings are obtained from flow meters that measure the velocity of the fluid within the pipeline. Since pressure is the more common mode of measurement, the description will be recited with respect to the measurement of pressure changes.

The transducers 02 are spaced at locations convenient to the pipeline operator, but typically approximately 10 miles apart along the length of a pipeline. Thus in a typical 20 mile pipeline we may have anywhere from 1 to 20 pressure monitoring positions. The more monitoring points the more quickly a problem can be detected and the greater the accuracy of the probability determinations of a problem being existent.

The transducers employed, may be devices capable of converting a hydraulic pressure to an electrical signal that is proportional to the pressure. Mention may be made of the Rosemount Inc. Series 1151 and the Foxboro Manufacturing Co E13 series of transducers among others. The signal generated may be continuous or sampled at discrete intervals of time. A sampling rate of about every 10 seconds has been found to give rise to excellent results. Sampled signals should be selected to have their sampling interval as short as possible such as 8-12 seconds, and such intervals should not be correlated to pressure fluctuation patterns, if one hopes to achieve sensitivity and accuracy of leak prediction. It is within the skill of the art to set sampling rates to avoid such a problem.

While prior art systems use pressure measurements, Covington differentiates the signal from point A so that the output at B is proportional to the rate of change in pressure with respect to time, i.e. $dp/dt$. Here, that approach is forsaken for a different approach.

What is done here is to take a large number of readings at each monitored point, (a location of a transducer along the pipeline for data collection) to find the average reading statistically of that finite number of data points, say 300 data points. A data point is a reading as of a certain instant in time taken from a specific transducer at a particular monitor (measurement) point. Then the measurements are taken for the same number of pressure data points, dropping the first say 20, and adding 20 new pressure data points. Again an average is calculated for the pressure each time that the newest data point is added, and the oldest data point is dropped. Thus for this example 20 different averages would be calculated. This procedure continues on an infinitive along the length of the pipeline, at each monitored point, dropping points, averaging the ones within the defined block of pressure points, after adding new individual points in line to the block; and then comparing this new statistical average to the previous average reading for that monitor location. This is called a comparison of moving averages.

It is readily seen that as the number of pressure data points is enlarged within the block to be averaged, increases or decreases at any one location give rise to an average reading that is relatively smaller than if the block contains few points within the moving average. Each averaged reading will reflect only an inconsequential difference from the previous average reading taken. This procedure tends to compensate for noise and other false indicators which may arise. Thus the curves generated on a readout tend to be relatively flat unless a problem exists.

The signals A, of any form proportional to pressure in the pipeline, preferably sampled rather than continuous from the plurality of transducers are fed to a statistical analyzer, 03 of the block diagram. A statistical analyzer is a device that is capable of interpreting the sampled signal from each transducer and performing certain statistical calculations from the data, as will be recited in more detail below.

It is to be appreciated by the reader that certain normal operating parameters will effect the statistical analysis to be carried out. These include the opening or closing of a valve; the operation or cessation of a pump; as well as noise, and change of flow rate among others. Since all of these external influences cannot in fact be overcome, the instant method predicts the probability that there is a break, leak or rupture of the pipeline, rather than the actuality.

While the method employed here to be recited below predicts the probability of a problem of say 1% chance to a 99% chance, there still remains the necessity for the monitor person to act on the probability information made available to him or her. It is the monitor person who must be influenced to act. When the probability is, for example in the 5% to 10% range, the monitor person may not want to go to the potential problem zone to check if indeed there is a problem. On the other hand when the probability fact is 85% to 90%, the monitoring party is certain of the necessity to check whether there is a problem.

By introducing a threshold actuator, such as bells or lights which go on at a particular preset level, the monitor person can screen out most false alarms, i.e. those instances when the probability of a problem is indeed very very low. Since the system of analysis employed herein qualifies the data, the monitor person is more apt to feel safe in relying on the information generated by the operation of this procedure.

The output B of the statistical analyzer 03, is fed to the AQL (additional qualifying logic) 04. This portion of the system is capable of modifying or nullifying the output of the statistical analyzer 03 subject to certain conditions that may occur in specific applications. While such a device is optional to the system more often than not, the AQL logic is present.

The output B, from the statistical analyzer often called a statistical processor, is the confidence factor that indeed a break or leak has taken place in the pipeline. Statistically, it will be recited as "z" in the statistics discussions to follow.

The primary reason for the AQL, 04 is the fact that other events can produce pressure patterns similar to those associated with a leak. Alarms should not sound, nor should other indicators report when known or predicted events transpire that give forth similar pressure patterns. Thus the stopping of a pump could in some instances produce pressure patterns similar to those of a leak. What the AQL will do to avoid false indications of a leak, is to act upon the output B of the statistical analyzer 04, and modify the output to a null or zero value when the occurrence of such an event is known. The output is held at that zero value for a period of time sufficient for the statistical analyzer to adjust to new conditions that are operating upon the pipeline. Statistically this will be shown in future discussions elsewhere herein.

After the signal has been reviewed by the AQL, and has been processed, it is made available for human understanding. Thus the processed signal is displayed or featured on 05, the display device. A display device that is suitable for presenting the processed data for interpretation by a human or other machine. This device 05 could be a meter, recorder, a series of lights or diodes, a computer terminal display. See FIG. 2.

The operator of the system inspects and monitors the display device 05, and takes appropriate action, if the system indicates a break or leak in the pipeline.

The displayed signal, c, may be fed to an actuation device 06. Alternatively but preferably the signal is sent to the display device. See FIG. 3. The action that the actuation device 06 can take, would be to bring about the closing of isolation valves. Other actions could be the stopping of the pumping of a pump(s) or the closing of a switch. While not needed, it is beneficial to have an actuation device 06 in the system.

STATISTICAL ANALYSIS

As has been discussed above with reference to FIG. 1, the data gathered from the plurality of transducers at various locations, one transducer per monitoring location is fed to the statistical analyzers. The signal previously designated as A is proportional to the pressure within the pipeline, and may be continuous or sampled to discrete intervals of time. Continuous signals are also preferably sampled such that the input signal constitutes a sampled signal, at prescribed time intervals. The beauty of the instant system is that not every value need be processed, although for the greatest accuracy, preferably all are processed.

Since we are dealing with a moving average, it is necessary to accumulate a set of values. Since each valve or reading or transducer input to be processed represents (i.e. is related to) the pressure on the pipeline at a particular location at a particular point in time, the following nomenclature can be used:

Pi is the i th pressure value
i−1 represents the most recent value
i−n represent the n th preceding value, A moving average (a term know to statisticians) of the last $n_1$ values is computed each time that a new value is available, i.e. a new piece of data is received. If the population moving average is represented by $\bar{\mu}$, then:

$$\bar{\mu}_i = \bar{\mu}_{i-1} + \frac{P_i - P_{i-n_1}}{n_1} \quad \text{(A)}$$

The standard deviation of this population may be computed by statistical methods known to those familiar to the art, using conventional computers or calculators. This deviation is expressed and represented by $\sigma$.

Computation of the statistical properties of a sample. A moving average of the most recent $n_2$ values is computed each time a new value is available. $n_2 < n_1$. If the sample moving average is represented by y then:

$$\bar{y}_i = \bar{y}_{i-1} + \frac{P_i - P_{i-n_2}}{n_2} \quad \text{(B)}$$

Computation of the confidence that $\mu$ and y are different. If z is the confidence interval, measured in standard deviations of u, that u and y are different, then:

$$z = \frac{\bar{\mu} - \bar{y}}{\frac{\sigma}{\sqrt{n_2}} \sqrt{\frac{n_1 - n_2}{n_1 - 1}}} \quad \text{(C)}$$

All of the procedures concerning the calculation of u, y, $\sigma$, and z are known statistical procedures and no invention is claimed in same. Conversion of z to percent probability is a statistical procedure common in the art and no invention is claimed for it either.

Reference is now made to FIG. 4.

In this plot, the horizontal axis represents time and the vertical axis represents pressure. The times noted are $t_o$, $t_1$, and $t_2$ wherein $t_o$ is at the start of a problem determination, $t_1$, the first finite time period thereafter, and $t_2$ the second interval of time thereafter.

When no problem exists, the pressure is at $P_{o-1}$, which is not seen on the table. $P_{o-1}$, is the same as $P_o$ at time $t_o$ which is when and at the pressure that a leak (actual) transpires. An expansion wave is generated and it travels to the location of the pressure measurement. The wave front arrives at time $t_1$. The expansion wave front is seen passing by the locations of the measurement of the pressure. At the time of the $t_2$ measurement, the wave front has passed by. One of several things can transpire depending upon the size of the leak, the design of the pipeline, and the operation of the line and the control scheme in use. Thus the pressure can D—Stabilize at a new steady state value
E—Continue to decrease as the line unpacks
F—Recover from a minimum value at $t_2$ to a higher value as mass transfer adjusts to the pipeline pressure gradient to a new steady state.

The pattern exhibited by the pressure readings at any point on the pipeline is evidence that a leak has occurred. The purpose of the system described herein is to detect the pattern and to determine the confidence with which the pattern has been detected.

In recapitulation it is seen that the $n_1$ sample is a large continuously updated moving average of $N_1$ data points. The $N_2$ sample is a continuously updated moving average of the last $N_2$ points within the confines of $N_1$. Thus a series of forty data points for example with a dropping of ten and an adding of ten could be used for $N_1$ to compute $\bar{\mu}$, while only the last five of these 40 points, for example with a dropping of two and adding two could be used to compute $\bar{y}$ for this $N_2$ moving average.

Figure 5:
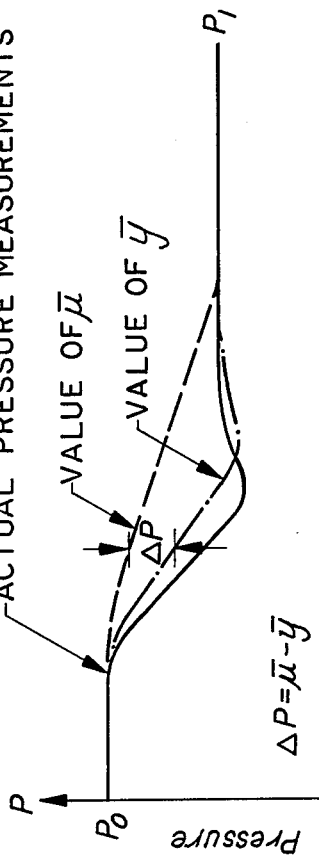
FIG. 5 graphically illustrates the application of a statistical filter upon the pressure pattern associated with a leak.

Turning now to FIG. 5, in order to properly analyze the data of the statistical analyzer, one applies a statistical filter. The analyzer and AQL, 03 and 04 make a determination of the probability of a leak using the moving average method, while the statistical filter, reviews all of the data points going into the analyzer and provides, i.e. a refinement of the probability of the leak.

The statistical filter can apply fair different tests to the data emanating from the statistical analyzer and AQL to help build the confidence in the output probability of a leak, break or rupture.

The statistical filter is specifically not shown as a separate block in FIG. 1 because in fact it is a part of the statistical analysis that takes place. Thus it can be envisioned as being interposed between the statistical analyzer 04 and the AQL 05.

In applying the statistical filter, and for carrying out the formula, one must preselect $n_1$, and $n_2$ preferably these are user adjustable to allow compensation for the characteristics of a specific application. The following guidelines may be utilized in the establishment of the initial values $n_1$ ; population size—The value of $n_1$ should be chosen to be small enough to permit the value of $\bar{\mu}$ to vary closely with and to follow closely the excursions in pressure that can arise from normal occurrences along the pipeline. Thus reference may be made to temperature, roughness, viscosity, fluidic state and other slow changing parameters.

Thus for a particular sampling interval designated, Δ, $$n_1 = \frac{2\,\delta P_1}{\frac{\partial P}{\partial t}\Delta t} + 1 \quad \text{(D)}$$

wherein $\delta P$, represents the largest deviation between $\bar{\mu}$ and p that can be tolerated without diminishing accuracy. The accuracy is seen to be related to the accuracy of the pressure measurement.

$$\frac{\partial P}{\partial t}$$

is defined as the rate at which pressure can change from normal occurrences.

Typically an $n_1$, of 300 to 400 is selected with the preferred mode being about 360.

$n_2$, The sample size—$n_2$ is selected to optimize the speed of detection. It's optimization depends upon the particular pressure pattern associated with the leak. The sample size used depends upon the mechanical characteristics of the pipeline, and the fluid as well as the size of the leak. In the preferred embodiment several values of $n_2$ would be used independently and simultaneously. Since the equations required for mathematical optimization on $n_2$ can not be solved analytically, the optimum values are best selected by leak simulations using a fully transient model of the pipeline. Such an evaluation is within the skill of the art to determine the $n_2$. Usually sample sizes of from about 1 to 25 are employed with the preferred range being 2 to 12.

It is seen therefore that $n_1$ and $n_2$, while being user controlled, usually vary with the diameter of the pipeline, the anticipated noise level in the pipeline and the scan rate. Scan rates also can vary from about 5 seconds to about 60 seconds apart.

Reference is now made to FIG. 5. At any point in time during a leak $$\Delta p = \bar{\mu} - \bar{y} \quad \text{(E)}$$

$$\bar{\mu} - \bar{y} = z \frac{\sigma}{\sqrt{n_2}} \sqrt{\frac{n_1 - n_2}{n_1 - 1}} \quad \text{(F)}$$

Therefore to determine $\Delta P$, the change in pressure, one uses the formula:

$$\Delta P = z \frac{\sigma}{\sqrt{n_2}} \sqrt{\frac{n_1 - n_2}{n_1 - 1}} \quad \text{(G)}$$

This last equation indicates the $\Delta P$ resulting from a leak at the threshold of detection with a confidence of z.

The confidence that a measured $\Delta P$ is indicative of a leak is z, as has been expressed supra, prior to the discussion of FIG. 4, where z was expressed in other terms in formula (c)

$$z = \frac{\Delta P}{\frac{\sigma}{\sqrt{n_2}}\sqrt{\frac{n_1 - n_2}{n_1 - 1}}} \quad \text{(H)}$$

Although it is optional to the operation of the statistical analyzer for leak detection, it should be noted that the probability that a leak exists may be found by computing the probability implied by z. This is done by standard statistical methods, also known to the art.

Thus it is seen that since the analysis of data by the computer here gives us a statistical answer, we are determining not the actuality of a leak, but the probability of a leak. Computation of z gives the monitor person a confidence level or reliability level that the chances are extremely high that what the data says is a leak, is in fact a leak, burst or rupture.

Supra we have set out in detail how one calculates the moving averages necessary to determine the probability of a break, leak or rupture in the pipeline or the like, when the characteristic being monitored is pressure using a pressure transducer. When the characteristic to be monitored is fluid flow, i.e. velocity, the procedures involved are the same and need not be repeated, only the formulae for the calculations are different.

Thus where $v_i$=the i th velocity ready, the population moving average is determined according to the formula $$\bar{\mu}_i = \frac{\sum\limits_{k=i-n_1}^{n_1} v_k}{n_1} = \bar{\mu}_{i-1} + \frac{v_i - v_{i-n_1}}{n_1}$$

and the sample moving average is $$\bar{y}_i = \frac{\sum\limits_{k=i-n_2}^{n_2} v_k}{n_2} = y_{i-1} + \frac{v_i - v_{i-n_2}}{n_2}$$

The confidence interval is expressed by solving for in formula (F).

The probability of a break, leak or rupture actually occurring, no matter which of the two characteristics is being monitored is:

$$(PP) = 2 \int_0^z Q(z)dz$$

wherein
(PP)=Probability
Q(z)=Probability density function
Z=Confidence interval in standard deviations
$\sigma$=Standard deviation of population It is seen that the computer calculations to determine the moving averages analyzed by the statistical analyzer of this invention utilizes data points, usually within the range of 300–400 points gathered at 10 second or so intervals. Typically 360 points may be reviewed. This first moving average designated the F.M.A. is compared to a second shorter moving average designated the S.M.A. The term shorter, means fewer data points, independent of the time sequence between determinations.

The S.M.A. typically has between 2 and 12 data points such that changes on this average show up quickly. When plotting these two moving averages, it is suggested that a different color or character be used to distinquish one from the other.

When the averages are compared such that there appears to be a pressure drop which may or may not be caused by a rupture leak or break, the operator of the computer console, must make a judgement as to whether there is a false alarm, or a real problem. In the prior art, if it looked like a problem, the operator had to check it out. Under the system of this invention, the operator can act intelligently in that the confidence factor determination allows him or her to analyze the trend in the data, to determine the probability that the "black box" computer calls a leak is actually a leak.

To facilitate his or her judgements, a threshold alarm can be programmed such that if the z factor is above a predefined percent of probability, a bell will sound or an LED lights up. Then the operator knows that the chances are pretty high—a relative determination—that there is a problem on the pipeline.

Obviously this threshold level, can be operator adjusted. One operator may want to check out a potential leak that is 35% sure while another operator wants a 75% probability of a leak before he or she checks the pipeline to confirm the findings.

Another nice feature that can be programmed into the software of the statistical analyzer is to project a trend in the confidence or reliability factor. Thus as the moving averages change, if the z goes from 30% to 40%, to 50% to 70% chance of a leak, break or rupture, as time continues, then the operator can study the trend and determine that corrective action is needed.

As has been indicated both $n_1$ and $n_2$ the sample sizes of the two moving averages can be operator determined. Thus if there is periodic noise in the pipeline, the sample sizes can be readily adjusted merely by a telephone - modem - computer hookup to adjust $n_1$ and $n_2$ such that the computer analysis can be run to compensate for the periodic noise or other known or anticipated pipeline problems.

The sample sizes can vary with various conditions, such as fluid, nature, pipeline diameter, air temperature, etc.

In conclusion it is seen that there are several advantages to the instant system over the prior art pipeline monitoring systems. The first and most important feature is the reduction in the incidence of false alarms. By being able to analyze the trend in the data that says there is a break leak or rupture, the operator can be more confident that once his or her predetermined threshold is exceeded, and he or she believes that these is a leak because the alarm sounded or the lights went on, there more than likely really will be a problem. In fact there may have been one, but then again there may not have been a problem.

The second advantage is that the instant monitoring system can be implemented without special equipment thereby resulting in significantly lower capital expenditures. The system of the Covington patents on the other hand, requires special pressure transmitters not common in the industry.

Thirdly, the "programming" for a computer is quite simple. The equations to be built into the program are all set forth previously herein. Since they are so relatively simple, it is seen that an operator with nimble fingers and the appropriate statistical calculator could just as easily carry out the necessary determinations as discussed above.

In contrast to prior art systems, while they may make a determination slightly more quickly that a leak, break or rupture has transpired, the monitor person who uses the instant system, will have to leave his or her station less frequently to personally inspect the pipeline to confirm the validity of the determination of a problem. This is due to the fact that the instant system qualifies the data it presents.

While the instant system as with any other pipeline monitoring system does not give an indication of a problem until the pressure change is shown by the pressure wave propagation along the pipeline to the monitoring equipment, i.e. the pressure transducer that notes the first indication of a disturbance. Thus the number of sensors can influence the speed of determination of a problem. Usually this time is less than 12 minutes.

The instant concept of refining the data, or stated another way, providing a trend in the data to the pipeline operator, or stated a third way, of providing a confidence level in the data is applicable to not only pressure point monitoring as has been described supra, but also to a fluid flow monitoring system. In this second embodiment of the invention, pressure transducers are replaced by fluid flow meters.

$n_1$ and $n_2$ are selected in the same manner and with consideration of the same things previously described. All equations previously presented apply except that $\mu$ and y refer to measurements of the velocity of flow instead of to the pressure.

Figure 6:
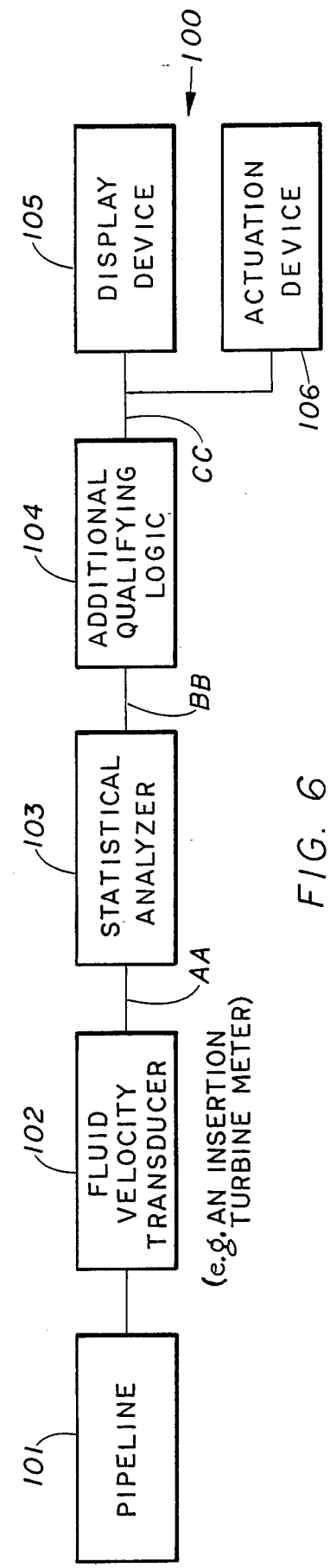
FIG. 6 is a block diagram of a system for monitoring of a pipeline using flow meters instead of pressure transducers.

Note that in FIG. 6, for embodiment 100, the pipeline statistical analyzer, AQL, Display Device, and actuation device previously referred to as 01, 03, 04, 05 and 06 are now numbers 101, 103, 104, 105 and 106 and are the same element. Also note A, B and C are the same as AA, BB and CC. Thus no details are recited herein.

Here too, a simple statistical calculator may be employed for the computations, though preferably, a personal computer program should be employed that incorporates the above equations.

Since statistical analysis programs are know in the computer art, it is readily understood that the writing of a program to incorporate the above equations can be easily carried out.

This reduced to its basics, it can be concluded that the invention herein pertains to a system for monitoring fluid pipelines or the like to determine the probability of a break, leak, or rupture therein using a procedure in which two or more moving averages of the value of a monitored parameter, each of said moving averages containing a different number of readings, are compared statistically to detect a trend in the readings that would be indicative of the aforementioned event.

IMPLEMENTATION

A typical pipeline can run from less than 1 mile to hundreds or even thousands of miles long. A full blown data acquisition system costing in the 6 or 7 figures could be employed, but is entirely unnecessary. The preferred and cheaper method is to have the data points defined previously, tied to modems and data transmission phone lines to feed information to a computer or microcomputer. The computer or microcomputer would handle a predetermined number of data points and do the statistical analysis. With appropriate data communications a single computer could serve the entire pipeline.

Along this line, of thinking, it is seen that the program can be easily set to give a "report by exception". That is, if the probability of a problem is below the operator determined threshold level, no data is reported; but when the threshold is exceeded, the probabilities of a break, leak, or rupture is reported.

It must be recognized that in prior art systems that look for wave fronts, that it is entirely possible that the entire occurrence of the problem could be missed. That is, if the computer in other systems does not cycle at the exact point in time when cycling on is needed, no data to indicate a problem —real or false—will be gathered.

Here however, since we check a moving average, instead of being a go—no go indicator, the instant system gives you a probability that there is a problem. Thus if one, even the most major data point is missed at one moment in time, there is no major consequence, since the change or delta in the moving averages will compensate for the loss of any one data point.

It should also be recognized that the term fluid as used herein both for pressure point and fluid flow monitoring refers to both liquids and gases.

Finally it is seen that the instant technique is a lower priced, more accurate means of predicting the reality of a break, leak or rupture of a fluid pipeline or the like.

Since certain changes may be made in the above device without departing from the scope of the invention here involved, it is intended that all matter contained in the above description and shown in the accompanying drawings shall be interpreted as illustrative and not in a limiting sense.

I claim:

1. A system for monitoring fluid pipelines or pressure vessels to determine the probability of a break, leak or rupture therein using a procedure in which two or more different sets of pressure or velocity measurements, each of said different sets containing a different number of readings, are compared statistically to detect a trend in the readings that would be indicative of a break, leak or rupture, which system comprises:
    (a) a fluid characteristic measuring means for monitoring a characteristic of a fluid in the pipeline, and which measuring means provides an output signal that is proportional to the characteristic being monitored;
    (b) statistical analyzer means receiving the output signal from a measuring means and providing a statistical analysis of the data from a transducer means to determine by a statistical analysis the probability of a break, leak, or rupture in said pipeline, said probability being expressed as an output signal to a display device.

2. The system of claim 1 wherein the characteristic being monitored is pressure and the characteristic measuring means is a transducer.

3. The system of claim 1 wherein the characteristic being monitored is fluid velocity and the characteristic measuring means is a fluid velocity meter.

4. The system of claim 1 further including additional qualifying logic means interposed between the statistical analyzer and the display device, for receiving the output signal from the statistical analyzer and nullify the value of the said signal upon the occurrence of prespecified events along the pipeline or the like thereby avoiding false alarms, and providing a qualified signal to the display device.

5. The system of claim 1 wherein the display device is a CRT screen.

6. The system of claim 4 wherein the display device is a CRT screen.

7. The system of claim 1 wherein the display device is a recorder.

8. The system of claim 4 wherein the display device is a recorder.

9. A method for detecting the probability of a break, leak or rupture of fluid from a pipeline which comprises the steps of:
    (a) monitoring a characteristic of the fluid in the pipeline from a single data collection site,
    (b) providing a signal proportional to the characteristic being monitored, from said site,
    (c) analyzing the data from the monitoring step for a predetermined quantity of the most recent data measurements, ($n_2$) by comparing the statistical properties of the $n_2$ measurements with the statistical properties of a second predetermined quantity of data measurements ($N_2$) said second quantity of measurements being made during a second period of time,
    wherein one of two conditions exists:
        (a) said second period of time is different from the time period of the most recent measurement period;
        (b) the number of measurements of the most recent time period differs from the number of measurements of the second time period, if the two time periods are of the same length, and wherein $n_2 < n_1$, and
    (d) displaying the analysis on a display device.

10. The method of claim 9 wherein the monitoring step comprises measuring one of the characteristics of pressure and velocity in the pipeline at a data collection site and providing an output signal proportional to the characteristic thereto.

11. The method of claim 9 wherein the monitoring step comprises measuring the fluid velocity of fluid in a pipeline or pressure vessels at a data collection site and providing an output signal proportional thereto.

12. The method of claim 9 further including the step of qualifying the data from the monitoring step to avoid false alarms.

13. The method of claim 9 further including the step of actuating a device to cause action to be taken along the pipeline or pressure vessels upon the determination of the probability of a break, leak or rupture, of the pipeline or the like.

14. The method of claim 12 further including the step of actuating a device to cause action to be taken along the pipeline or pressure vessels upon the determination of the probability of a break, leak or rupture, of the pipeline or the like.

15. The system of claim 1 further including an actuation device adapted to take corrective action along the pipeline or pressure vessels upon the determination of the probability of a break, leak or rupture to the pipeline or the like.

16. The system of claim 4 further including an actuation device adapted to take corrective action along the pipeline or pressure vessels upon the determination of the probability of a break, leak or rupture to the pipeline or the like.

17. An apparatus for determining the probability of a break, leak or rupture of a pipeline which comprises:
    (a) means for monitoring the pressure, P, of fluid in a pipeline and providing an output signal proportional to the measurement of the pressure,
    (b) statistical analysis means for receiving the output signal of the means for monitoring the pressure, and for providing an output signal to a display device, for determining the probability that a change of pressure in the pipeline is indeed a break, leak or rupture, by applying a statistical analysis to the output signal of the means for monitoring the pressure according to the procedure recited below, and using the formulae set forth:

$$\Delta P = \overline{\mu} - \overline{y}.$$

wherein $$\overline{\mu} - \overline{y} = z \frac{\gamma}{\sqrt{n_2}} \sqrt{\frac{n_1 - n_2}{n_1 - 1}}$$

and further wherein $n_2$ is the quantity of the most recent measurements of the pressure and n is a different quantity of pressure measurements, which quantity is greater than the $n_2$ quantity of measurements;

(a) based upon a series of readings of the pressure, compute the average value of the most recent $n_2$ readings of the pressure thus yielding a value for $\overline{y}$;

(b) determining the average value of the $n_1$ readings of the pressure, which $n_1$ readings preceded the $n_2$ readings taken for use in step (a), thereby yielding a value for $\mu$;

(c) determining the standard deviation of the entire set of pressure readings as computed above using known statistical procedures;

(d) determine statistically whether the pressure readings that gave rise to the value calculated for $\overline{y}$ are statistically different from the pressure readings that gave rise to the value calculated for $\mu$ and if so, (e) conclude that an event that could have been a break, leak or rupture, was statistically more than likely a break, leak or rupture; and if not, was statistically less than likely a break, leak or rupture.

18. The apparatus of claim 17 further including a display device and an actuation device to take appropriate action to the pipeline upon the determination of a break, leak or rupture.

19. The apparatus of claim 17 further including additional qualifying logic to review the output of the statistical analysis means to avoid false alarms, prior to sending the signal to a display device.

20. The apparatus of claim 18 further including additional qualifying logic to review the output of the statistical analysis means to avoid false alarms, prior to sending the signal to a display device.

21. An apparatus for determining the probability of a break, leak or rupture of fluid from a pipeline which comprises:

(a) means for monitoring velocity, V, of fluid in a pipeline and providing an output signal proportional to the measurement of the velocity, (b) statistical analysis means for receiving the output signal of the means for monitoring the velocity, and for providing an output signal to a display device, for determining the probability that a change of velocity in the pipeline is indeed a break, leak or rupture, by applying an analysis to the output signal of the means for monitoring the velocity according to the procedure recited below and using the formulae set forth:

$$\Delta v = \mu - y$$

wherein $$\mu - y = z \frac{\gamma}{\sqrt{n_2}} \sqrt{\frac{n_1 - n_2}{n_1 - 1}}$$

and further wherein $n_2$ is the quantity of the most recent measurements of the velocity, and $n_1$ is a different quantity of velocity measurements, which quantity is greater than the $n_2$ quantity;

(a) based upon a series of readings of the velocity, compute the average value of the most recent $n_2$ readings of the velocity thus yielding a value for $\overline{y}$;

(b) determining the average value of the $n_1$ readings of the velocity, which $n_1$ readings preceded the $n_2$ readings taken for use in step (a), thereby yielding a value for $\mu$;

(c) determining the standard deviation of the entire set of velocity readings as computed above using known statistical procedures;

(d) determine statistically whether the velocity readings that gave rise to the value calculated for $\overline{y}$ are statistically different from the velocity readings that gave rise to the value calculated for $\mu$ and if so;

(e) conclude that an event that could have been a break, leak or rupture, was statistically more than likely a break, leak or rupture; and if not, was statistically less than likely a break, leak or rupture.

22. The apparatus of claim 21 further including a display device and an actuation device to take appropriate action to the pipeline or pressure vessels upon the determination of a break, leak or rupture.

23. The apparatus of claim 21 further including additional qualifying logic to review the output of the statistical analysis means to avoid false alarms, prior to sending the signal to a display device.

24. The apparatus of claim 22 further including additional qualifying logic to review the output of the statistical analysis means to avoid false alarms prior to sending the signal to a display device.

* * * * *